United States Patent Office 3,406,198
Patented Oct. 15, 1968

3,406,198
TRIARYLARSINES AS CATALYSTS FOR CONVERTING ISOCYANATES TO CARBODIIMIDES
Edward G. Budnick, Scotch Plains, N.J., assignor to The Upjohn Company, Kalamazoo, Mich., a corporation of Delaware
No Drawing. Filed Aug. 5, 1966, Ser. No. 570,420
14 Claims. (Cl. 260—551)

ABSTRACT OF THE DISCLOSURE

Triarylarsines, wherein the aryl group is free of substituents containing reactive hydrogen atoms, are employed as catalysts in converting certain organic isocyanates to the corresponding carbodiimides. The starting organic isocyanates can be secondary alkyl, primary alkyl (of more than 10 carbon atoms), cycloalkyl, or aryl isocyanates. The aryl group in the latter can be substituted by groups free from reactive hydrogen atoms provided that one position ortho to the NCO group is unsubstituted. The carbodiimides so obtained are useful as polyester stabilizers, acylation catalysts, and condensing agents in peptide synthesis.

---

This invention relates to a process for the conversion of organic isocyanates to the corresponding carbodiimides and is more particularly concerned with a novel catalytic process for the conversion of certain organic isocyanates to the corresponding carbodiimides.

The novel process of the invention consists in a process for the conversion to the corresponding carbodiimide of an organic isocyanate selected from the group consisting of secondary alkyl isocyanates, primary alkyl isocyanates wherein the alkyl moiety has more than ten carbon atoms, cycloalkyl isocyanates, aryl isocyanates and substituted aryl isocyanates wherein at least one of the positions ortho to the isocyanato group is unsubstituted, which process comprises heating said organic isocyanates at a temperature within the range of about 80° C. to about 250° C. in the presence of a catalytic amount of a triarylarsine wherein the aryl groups are free from substituents containing reactive hydrogen atoms.

The catalytic conversion of organic isocyanates to the corresponding carbodiimides is well-known in the art; see, for example, U.S. Patents 2,840,589, 2,853,473, 2,853,518, 3,056,835, 3,152,131 and 3,157,662. It has been shown by Monagle, J. Org. Chem., 27, 3851, 1962, that a number of organic oxides of nitrogen, arsenic, phosphorus, and other elements of Groups V–B and VI–B are effective catalysts in the conversion of organic isocyanates to carbodiimides. In particular Monagle, supra, discloses that triphenylarsine oxide is an effective catalyst in the conversion of phenyl isocyanate and 2-octyl isocyanate to the corresponding carbodiimides and that tri (m-nitrophenyl)arsine oxide is an effective catalyst in the conversion of phenyl isocyanate to the corresponding carbodiimide.

However, as shown by Herbstmann J. Org. Chem. 30, 1259, 1965, triphenylarsine oxide suffers the disadvantage that it readily causes trimerisation of the isocyanate in addition to or, in some cases, instead of conversion to carbodiimide.

I have now found, surprisingly and unexpectedly, that triarylarsines possess excellent activity as catalysts in the conversion of organic isocyanates to the corresponding carbodiimides and, in contrast to the corresponding triarylarsine oxides, are free from any significant tendency to cause trimerisation of the isocyanate. I have found further and unexpectedly that the catalytic activity of the triarylarsines is remarkable selective. In the case of certain classes of isocyanate the use of a triarylarsine as catalyst produces rapid reaction and high yields of the corresponding carbodiimides. In the case of other classes of isocyanates the rate of reaction at reasonable temperatures is too slow to be of economic value, and, indeed, in certain instances no reaction appears to take place even in the presence of high concentrations of triarylarsine catalyst and using a wide range of reaction temperatures.

Those classes of organic isocyanate which are converted to the corresponding carbodiimides readily and in high yields at reasonable temperatures (i.e. temperatures below those at which the particular isocyanate employed is subject to degradation, polymerization or like undesirable reactions) include secondary alkyl isocyanates, primary alkyl isocyanates wherein the alkyl moiety has at least ten carbon atoms, cycloalkyl isocyanates, and aryl isocyanates wherein at least one of the positions ortho to the isocyanato group in the aryl nucleus is unsubstituted.

The term "secondary alkyl isocyanate" has the meaning conventionally ascribed thereto namely, an isocyanate wherein the isocyanato group is attached to a carbon atom in a saturated aliphatic moiety, which carbon atom carries only one hydrogen atom and is attached directly to two other carbon atoms. Preferably the secondary alkyl moiety has from 3 to 18 carbon atoms inclusive. Examples of secondary alkyl isocyanates are isopropyl isocyanate, sec-butyl isocyanate, sec-amyl isocyanates, 1-methylpentyl isocyanate, 1-methylheptyl isocyanate, 1-ethylnonyl isocyanate, 1-ethyldecyl isocyanate, 1-methylheptadecyl isocyanate, 1-pentyldecyl isocyanate, 1-ethylbutyl isocyanate and the like. The term "cycloalkyl isocyanate" as used throughout the specification and claims has the meaning normally attributed thereto in the art namely that of designating an isocyanate wherein the isocyanato group is attached to a carbon atom present in a cycloalkane ring. Preferably the cycloalkane ring contains from 4 to 8 carbon atoms. Examples of cycloalkyl isocyanates are cyclobutyl isocyanate, cyclopentyl isocyanate, cyclohexyl isocyanate, cycloheptyl isocyanate, cyclooctyl isocyanate, and the like. The term "primary alkyl isocyanate" has the meaning conventionally ascribed thereto namely that of designating an isocyanate wherein the isocyanato group is attached to a carbon atom in a saturated aliphatic moiety which carbon atom carries 2 hydrogen atoms and is attached directly to only one other carbon atom. The primary alkyl isocyanates employed in the process of the invention have at least 10 carbon atoms in the alkyl moiety. Preferably the primary alkyl isocyanates employed in the process of the invention have from about 10 to about 20 carbon atoms in the alkyl moiety. Examples of primary alkyl isocyanates meeting the above requirements are decyl isocyanate, dodecyl isocyanate, tetradecyl isocyanate, hexadecyl isocyanate, octadecyl isocyanate, and the like.

The term "aryl isocyanate" has the meaning conventionally ascribed thereto in the art, namely that of designating an isocyanate wherein the isocyanate group is attached directly to a nuclear carbon atom in an aryl moiety. Examples of aryl moieties are phenyl, tolyl, xylyl, naphthyl, biphenylyl and the like. Said aryl moiety can be unsubstituted or can be substituted by one or more substituents (up to a maximum of 4) which do not contain reactive hydrogen atoms, provided that at least one of the positions ortho to the isocyanato group in the aromatic nucleus is unsubstituted. By "reactive hydrogen atoms" is meant hydrogen atoms which give a positive reaction in the Zerewitinoff test as described in J. Am. Chem. Soc. 49, 3181, 1927. Examples of substitutents which do not contain reactive hydrogen atoms are halo (i.e. chloro, bromo, fluoro, and iodo), nitro, alkoxy such as methoxy, ethoxy, propoxy, hexyloxy and the like, alkylmercapto such as methylmercapto, ethylmercapto, butylmercapto, hexylmercapto and the like, and cyano.

The triarylarsines which are employed as catalysts in the process of the invention are a well-known class of compounds which can be represented by the formula

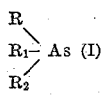

wherein each of the groups R, $R_1$ and $R_2$ represent the same or a different aryl moiety, wherein aryl has the meaning defined and exemplified above in discussing the meaning of the term aryl isocyanate. Said aryl groups R, $R_1$ and $R_2$ can be unsubstituted or can be substituted by one or more substituents which do not contain reactive hydrogen atoms as hereinbefore defined and exemplified.

Exmaples of triarylarsines of Formula I are triphenylarsine, tris(p-tolyl)arsine, tris(p-methoxyphenyl)arsine, tris(p - ethoxyphenyl)arsine, tris(p-chlorophenyl)arsine, tris(p-fluorophenyl)arsine, tris(2,5 - xylyl)arsine, tris(p-cyanophenyl)arsine, tris(1-naphthyl)arsine, tris(p-methylmercaptophenyl)arsine, tris(p - biphenylyl)arsine, p-chlorophenyl bis(p-tolyl)arsine, phenyl(p-chlorophenyl) (p-bromophenyl)arsine, phenyl (p-biphenylyl)(p-chlorophenyl)arsine, phenyl(p - tolyl)(p - chlorophenyl)arsine, and the like.

In carrying out the process of the invention the desired organic isocyanate starting material is heated in the presence of a catalytic quantity of the triarylarsine (I). Preferably the isocyanate and the catalyst (I) are admixed prior to heating but, alternatively, the catalysts can be added to the isocyanate after the latter has been heated to the desired temperature. The temperature at which the reaction is carried out is advantageously of the order of about 80° C. to 250° C. and preferably within the range of about 120° C. to about 160° C.

By "catalytic quantity" of the catalyst (I) is meant a quantity less than 1 mole per mole of isocyanate and advantageously a quantity within the range of 0.10 percent to about 5 percent by weight based on the amount of isocyanate. Preferably the amount of catalyst (I) employed in the process of the invention is of the order of about 0.2 percent to about 1 percent by weight of isocyanate.

If desired, an inert organic solvent can be employed as reaction diluent but is generally found to be unnecessary in that its use does not offer any advantage in terms of yield, reaction time, or overall ease of processing. By inert organic solvent is meant an organic solvent which does not enter into reaction with any of the other components of the reaction mixture or interfere in any way with the course of the reaction. Examples of such solvents are benzene, toluene, xylene, decalin, tetradecalin, chlorobenzene, o-dichlorobenzene, and the like.

The reaction is allowed to proceed under the above stated conditions until conversion to carbodiimide is complete. The attainment of this point can be determined by methods which will be obvious to one skilled in the art; for example, by measurment of the amount of carbon dioxide eliminated or by observation of the disappearance of the infrared absorption band at 4.4μ which is characteristic of the —NCO group. When this end point is reached the desired carbodiimide can be isolated from the reaction product by procedures conventional in the art. For example, when the carbodiimide is sufficiently volatile to be distilled, separation can be effected by fractional distillation. In the case of solid carbodiimides separation and isolation can be achieved by solvent extraction, fractional crystallization, and the like techniques. Other alternative methods of achieving separation and isolation include chromatography, countercurrent distribution, and the like. In general it is desirable to choose as catalyst for any particular isocyanate a compound (I) which has a boiling point, or solvent solubility characteristics, sufficiently distinguished from the corresponding property of the resultant carbodiimide as to facilitate the separation of the two components of the reaction mixture.

In the case of catalysts (I) which are sufficiently less volatile than the carbodiimide produced in the process of the invention to enable the latter to be removed from the reaction product by distillation, it has been found that the reaction product residue containing the used catalyst can be employed in the conversion of a further charge of isocyanate to the corresponding carbodiimide. Hence, in such cases it is possible to employ one charge of catalyst (I) to convert a multiplicity of charges of isocyanate to the corresponding carbodiimide. The use of such a procedure offers obvious advantages in terms of reduction of operation costs including raw materials and labour. The above semicontinuous process represents a particular aspect of the novel process of the invention.

As will be appreciated by one skilled in the art the use of a single mono-isocyanate in the process of the invention will give rise to a symmetrically substituted carbodiimide whereas the use of a mixture of two or more isocyanates in the process of the invention will give rise to the corresponding mixed carbodiimides. The exact composition of the resulting product depends upon the nature and proportion of the isocyanates present in the starting material.

While the above description and exemplification of the process of the invention has been given in terms of monomeric isocyanates it will be readily appreciated that use of the corresponding diisocyanates or higher polyisocyanates, provided that the essential nature of the starting isocyanate remains unchanged, will give rise to the corresponding polycarbodiimides.

The mono- and polycarbodiimides which can be produced by the process of the invention are well-known in the art and their usefulness is well-recognized in the art. For example, the mono- and polycarbodiimides can be used as stabilisers for polyesters and for polyurethanes derived therefrom in accordance with the procedures described in U.S. Patents 3,193,522, 3,193,523, 3,193,524 and 3,193,525. Many of the monocarbodiimides produced in accordance with the invention are also useful as catalysts in the acylation of high molecular weight polyoxymethylenes as described in U.S. Patent 3,170,896, and as condensation agents in the preparation of peptides as is described by Sheehan et al. J. Am. Chem. Soc. 77, 1067, 1955.

The polycarbodiimides prepared in accordance with the process of the invention are high molecular weight stable polymers which can be formed, by conventional procedures, into a variety of shaped articles including fibers, films, sheets and the like.

The following examples describe the manner and process of making and using the invention and set forth the best mode contemplated by the inventors of carrying out the invention but are not to be construed as limiting.

*Example 1*

A mixture of 62.5 g. of cyclohexylisocyanate and 1.25 g. (2 percent by weight based on isocyanate) of triphenylarsine was prepared at 75° C. and then heated rapidly with stirring to 140° C. The mixture was then maintained at 140 to 148° C. until evolution of carbon dioxide ceased. At the end of this time (100 minutes) the reaction mixture was fractionally distilled. There was thus obtained 42.8 g. (83.5% theoretical yield) of dicyclohexyl carbodiimide having a boiling point of 95 to 97° C. at a pressure of 0.1 mm. of mercury.

The above procedure was repeated with the exception that the amount of catalyst was halved and the reaction temperature was increased to 180° C. Evolution of carbon dioxide ceased after 18 minutes. The yield of dicyclohexyl carbodiimide (after distillation) was unchanged.

Example 2

A mixture of 17 g. of isopropyl isocyanate and 0.34 g. (2% by weight based on isocyanate) of triphenylarsine was heated at 80 to 85° C. until evolution of carbon dioxide ceased. The reaction mixture was distilled under reduced presusre. There was thus obtained 7.6 g. (71.6% theoretical yield) of diisopropylcarbodiimide having a boiling point of 53° C. at 25 mm. of mercury.

Example 3

A mixture of 29.5 g. (0.1 mole) of octadecyl isocyanate and 0.59 g. (2% by weight based on isocyanate) of triphenylarsine was heated at 185° C. until evolution of carbon dioxide ceased (elapsed time 6.25 hr.). The resulting product crystallised on cooling to give a mixture of triphenylarsine and dioctadecylcarbodiimide as a solid having a melting point of 50 to 55° C. The dioctadecyl carbodiimide was purefied by recrystallisation from acetone.

Example 4

A mixture of 66.5 g. of o-tolyl isocyanate and 0.133 g. (0.2% by weight) of triphenylarsine was heated to 150° C. and maintained at 150 to 165° C. until evolution of carbon dioxide substantially ceased. (Elapsed time 350 minutes.) The resulting mixture was distilled under reduced pressure. There was thus obtained 1.8 g. (2.7%) of unreacted o-tolyl isocyanate and 48 g. (86.5% theoretical yield) of di-o-tolyl-carbodiimide having a boiling point of 145 to 150° C. at a pressure of 0.8 mm. of mercury.

Example 5

A mixture of 26.6 g. of o-tolyl isocyanate and 0.26 g. (1% by weight based on isocyanate) of triphenylarsine was heated under reflux for 1 hr. at the end of which time a further 0.26 g. of triphenylarsine was added. The resulting mixture was heated under reflux for several minutes and was then distilled under reduced pressure. There was thus obtained 20.75 g. (93.4% theoretical yield) of di-o-tolyl-carbodiimide having a boiling point of 126° C. at a pressure of 0.1 mm. of mercury.

Example 6

A mixture of 28.5 g. of cyclohexyl isocyanate and 0.57 g. (2% by weight based on isocyanate) of triphenylarsine was heated rapidly in an oil bath (temperature of oil bath reached 140° C. after 35 minutes and a maximum of 165° C. thereafter) until evolution of gas ceased. The reaction product was then distilled under reduced pressure using a 6-inch vacuum jacketed Vigreux column. There was thus obtained 20.8 g. (88% theoretical yield) of dicyclohexylcarbodiimide having a boiling point of 134° C. at a pressure of 5 mm. of mercury.

Example 7

A mixture of 21.2 g. of isopropyl isocyanate and 1.06 g. (5% by weight based on isocyanate) of triphenylarsine was heated in an oil bath (temperature of bath raised rapidly to 103° C. and then slowly to a maximum of 150° C.) until evolution of carbon dioxide ceased (1 hr. 15 minutes elapsed time). The reaction product was distilled under reduced pressure using a 6-inch vacuum jacketed Vigreux column. There was thus obtained 12.2 g. (77% theoretical yield) of diisopropylcarbodiimide having a boiling point of 83.5° C. to 85.5° C. at 90 mm. of mercury.

The undistilled residue (triphenylarsine) from the above experiment was left in the reaction flask and to the residue was added 20.9 g. of isopropyl isocyanate. The resulting mixture was heated in an oil bath (temperature of bath raised rapidly to 160° C. and hereafter slowly to 150° C.) until evolution of carbon dioxide ceased (elapsed time 1 hr.). The reaction product was distilled under reduced pressure using a 6-inch vacuum jacketed Vigreux column. There was thus obtained 14.0 g. (89% theoretical yield) of diisopropyl carbodiimide.

Example 8

Using the procedure described in Example 1, but replacing cyclohexyl isocyanate by phenyl isocyanate, there is obtained diphenylcarbodiimide.

Similarly, using the procedure described in Example 1, but replacing cyclohexyl, isocyanate by sec-butyl isocyanate, 1-methylpentyl isocyanate, 1-methylheptyl isocyanate, 1-ethyldecyl isocyanate, 1-methylheptadecyl isocyanate, cyclopentyl isocyanate, cyclooctyl isocyanate, 2,5-xylyl isocyanate, 1-naphthyl isocyanate, 2-naphthyl isocyanate, 4-biphenylyl isocyanate, 4-bromophenyl isocyanate, 4-trifluoromethylphenyl isocyanate, 3-methylmercaptophenyl isocyanate, 2-methoxyphenyl isocyanate, 4-cyanophenyl isocyanate or 4-nitrophenyl isocyanate, there are obtained di(sec-butyl)carbodiimide, di(1-methylpentyl)carbodiimide, di(1-methylheptyl)carbodiimide, di(1-ethyldecyl)carbodiimide, di(1-methylheptadecyl)carbodiimide, di(cyclopentyl)carbodiimide, di(cyclooctyl)carbodiimide, di(2,5-xylyl)carbodiimide, di(1-naphthyl)carbodiimide, di(2-naphthyl)carbodiimide, di(4-biphenylyl)carbodiimide, di(4-bromophenyl)carbodiimide, di(4-trifluoromethylphenyl)carbodiimide, di(3-methylmercaptophenyl)carbodiimide, di(2-methoxyphenyl)carbodiimide, di(4-cyanophenyl)carbodiimide, and di(4-nitrophenyl)carbodiimide, respectively.

Example 9

Using the procedure described in Example 1 but replacing triphenylarsine by tris(p-tolyl)arsine, there is obtained dicyclohexylcarbodiimide in comparable yield.

Similarly, using the procedure described in Example 1, but replacing triphenylarsine by tris(p-methoxyphenyl)arsine, tris(p-ethoxyphenyl)arsine, tris(p-chlorophenyl)arsine, tris(p-fluorophenyl)arsine, tris(2,5-xylyl)arsine, tris(p-cyanophenyl)arsine, tris(1-naphthyl)arsine, tris(p-methylmercaptophenyl)arsine, tris(p-biphenylyl)arsine p-chlorophenylbis(p-tolyl)arsine, phenyl(p-chlorophenyl)(p-bromophenyl)arsine, phenyl(p-biphenylyl)(p-chlorophenyl)arsine, or phenyl(p-tolyl)(p-chlorophenyl)arsine there is also obtained dicyclohexyl carbodiimide.

I claim:

1. A process for the conversion to the corresponding carbodiimide of an organic isocyanate selected from the group consisting of a secondary alkyl isocyanate wherein the secondary alkyl is from 3 to 18 carbon atoms, inclusive, a primary alkyl isocyanate wherein the primary alkyl moiety is from 10 to 20 carbon atoms, inclusive, a cycloalkyl isocyanate wherein the cycloalkyl is from 4 to 8 carbon atoms, inclusive, an aryl isocyanate wherein aryl is selected from the class consisting of phenyl, tolyl, xylyl, naphthyl and biphenylyl each of which is substituted by from 0 to 4 substituents selected from the class consisting of halo, nitro, alkoxy from 1 to 6 carbon atoms, inclusive, alkylmercapto from 1 to 6 carbon atoms, inclusive, and cyano provided that at least one of the positions ortho to the isocyanato group in the aryl nucleus is unsubstituted, which process comprises heating said organic isocyanate at a temperature within the range of about 80° C. to about 250° C. in the presence of a triarylarsine wherein aryl is as above defined, said triarylarsine being employed in an amount less than equimolar with respect to said organic isocyanate.

2. A process according to claim 1 wherein the triarylarsine is triphenylarsine.

3. A process for the conversion of a cycloalkyl isocyanate to the corresponding dicycloalkylcarbodiimide, wherein cycloalkyl in both cases is from 4 to 8 carbon atoms, inclusive, which comprises heating said cycloalkyl isocyanate to a temperature within the range of about 80° C. to about 250° C. in the presence of a triarylarsine wherein aryl is selected from the class consisting of phenyl, tolyl, xylyl, naphthyl and biphenylyl each of which is substituted by from 0 to 4 substituents selected from the class consisting of halo, nitro, alkoxy from 1 to 6 carbon atoms, inclusive, alkylmercapto from 1 to 6 carbon atoms, inclusive, and cyano, said triarylarsine being employed in an amount less than equimolar with respect to said organic isocyanate.

4. A process according to claim 3 wherein the cycloalkyl isocyanate is cyclohexyl isocyanate.

5. A process according to claim 4 wherein the triarylarsine is triphenylarsine.

6. A process for the conversion of a secondary alkyl isocyanate, wherein the secondary alkyl is from 3 to 18 carbon atoms, inclusive, to the corresponding carbodiimide which comprises heating said secondary alkyl isocyanate to a temperature within the range of about 80° C. to about 250° C. in the presence of a triarylarsine wherein aryl is selected from the class consisting of phenyl, tolyl, xylyl, naphthyl, and biphenylyl each of which is substituted by from 0 to 4 substituents selected from the class consisting of halo, nitro, alkoxy from 1 to 6 carbon atoms, inclusive, alkylmercapto from 1 to 6 carbon atoms, inclusive, and cyano, said triarylarsine being employed in an amount less than equimolar with respect to said organic isocyanate.

7. A process according to claim 6 wherein the secondary alkyl isocyanate is isopropyl isocyanate.

8. A process according to claim 7 wherein the triarylarsine is triphenylarsine.

9. A process for the conversion of an aryl isocyanate, wherein the aryl moiety is selected from the class consisting of phenyl, tolyl, xylyl, naphthyl and biphenylyl and contains from 0 to 4 substituents selected from the class consisting of halo, nitro, alkoxy from 1 to 6 carbon atoms, inclusive, and cyano, provided that said aryl moiety is unsubstituted in at least one of the positions ortho to the isocyanato group, to the corresponding carbodiimide which process comprises heating said aryl isocyanate to a temperature within the range of about 80° C. to about 250° C. in the presence of a triarylarsine wherein aryl is as above defined, said triarylarsine being employed in an amount less than equimolar with respect to said organic isocyanate.

10. A process according to claim 9 wherein the aryl isocyanate is o-tolyl isocyanate.

11. A process according to claim 10 wherein the triarylarsine is triphenylarsine.

12. A process for the conversion of a primary alkyl isocyanate of from 10 to 20 carbon atoms, inclusive, in the primary alkyl moiety to the corresponding carbodiimide which process comprises heating said primary alkyl isocyanate to a temperature within the range of about 80° C. to about 250° C. in the presence of a triarylarsine wherein aryl is as above defined, said triarylarsine being employed in an amount less than equimolar with respect to said organic isocyanate.

13. A process according to claim 12 wherein the primary alkyl isocyanate is octadecyl isocyanate.

14. A process according to claim 13 wherein the triarylarsine is triphenylarsine.

References Cited

UNITED STATES PATENTS 3,157,662   11/1964   Smeltz _____ 260—551

HENRY R. JILES, *Primary Examiner.*

H. MOATZ, *Assistant Examiner.*